(12) United States Patent
Hoffman et al.

(10) Patent No.: US 11,528,152 B2
(45) Date of Patent: Dec. 13, 2022

(54) WATERMARKING FOR ELECTRONIC DEVICE TRACKING OR VERIFICATION

(71) Applicant: Raytheon Company, Waltham, MA (US)

(72) Inventors: Colby K. Hoffman, Fairview, TX (US); William T. Jennings, Plano, TX (US); Michelle Moholt, Celina, TX (US)

(73) Assignee: Raytheon Company, Waltham, MA (US)

( * ) Notice: Subject to any disclaimer, the term of this patent is extended or adjusted under 35 U.S.C. 154(b) by 5 days.

(21) Appl. No.: 17/068,467

(22) Filed: Oct. 12, 2020

(65) Prior Publication Data

US 2022/0116233 A1 Apr. 14, 2022

(51) Int. Cl.
*H04L 9/32* (2006.01)
*G01R 31/319* (2006.01)

(52) U.S. Cl.
CPC ...... *H04L 9/3278* (2013.01); *G01R 31/31917* (2013.01); *H04L 9/3247* (2013.01); *H04L 2209/608* (2013.01)

(58) Field of Classification Search
CPC .......... H04L 9/3278; H04L 9/3247; H04L 2209/608; H04L 9/32; G01R 31/31917; G01R 31/319
See application file for complete search history.

(56) References Cited

U.S. PATENT DOCUMENTS

| | | | |
|---|---|---|---|
| 7,577,850 B2 | 8/2009 | Barr | |
| 9,590,636 B1 | 3/2017 | Mckinley et al. | |
| 9,672,342 B2 | 6/2017 | Walsh et al. | |
| 9,715,590 B2 | 7/2017 | Gardner et al. | |
| 9,759,757 B2 | 9/2017 | House et al. | |
| 9,946,858 B2 | 4/2018 | Wallrabenstein | |
| 9,998,445 B2 | 6/2018 | Wallrabenstein | |
| 10,013,543 B2 | 7/2018 | Walsh et al. | |
| 10,425,235 B2 | 9/2019 | Wallrabenstein et al. | |
| 10,432,409 B2 | 10/2019 | Wallrabenstein | |

(Continued)

OTHER PUBLICATIONS

Delvaux, Jeroen, et al., "A Survey on Lightweight Entity Authentication with Strong PUFs", ACM Computing Surveys, vol. 48, No. 2, (Oct. 2015), 40 pgs.

(Continued)

*Primary Examiner* — Quazi Farooqui
(74) *Attorney, Agent, or Firm* — Schwegman Lundberg & Woessner, P.A.

(57) ABSTRACT

Generally discussed herein are systems, devices, and methods for device verification. A method can include providing, by test equipment (TE), electrical stimulus consistent with a challenge of a challenge response pair (CRP) to a physical unclonable function (PUF) of a device under test (DUT), receiving, by the TE and from the DUT, a response to the electrical stimulus, comparing, by the TE, the provided response to responses to CRPs in a database including PUF CRPs associated with a device identification and a device type, and validating the identity of the DUT when the response of the PUF to the electrical stimulus matches the response of the CRP or invalidating the identity of the electrical device when the response of the PUF does not match the response of the CRP.

20 Claims, 5 Drawing Sheets

(56) References Cited

U.S. PATENT DOCUMENTS

2018/0183613 A1* 6/2018 Dafali .................... G09C 1/00
2020/0356085 A1* 11/2020 Wentz ................. G01R 31/317

OTHER PUBLICATIONS

Ruhrmair, Ulrich, et al., "PUFs at a Glance", 2014 Design, Automation & Test in Europe Conference & Exhibition (DATE), (Mar. 24, 2014), 6 pgs.

* cited by examiner

WATERMARKING FOR ELECTRONIC DEVICE TRACKING OR VERIFICATION

TECHNICAL FIELD

Embodiments discussed herein generally relate to processes for secure identification, authentication, tracking, or control of electronic devices. Embodiments can be used in supply chains or other areas of an electronic device life cycle.

BACKGROUND

Prior electronic device tracking includes auditing of assets. In such auditing, an external mark, typically including some globally unique indicia (e.g., a number or other series of characters, a quick response (QR) code, or the like), is applied to an external, easily accessible portion of the electronic device. A database indexing the device relative to the globally unique indicia is then accessed to determine a history of the device. These auditing systems are easily fooled, as the globally unique indicia can be removed, placed on another device, copied and placed on another electronic device, or the like. This makes these auditing systems insecure and inaccurate for many applications and settings.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to watermarking approaches and processes for secure identification, authentication, tracking, or control of electronic processing devices. Embodiments can be applied in multiple portions of the life cycle of these devices. Watermarks from prior life cycle process steps can be authenticated at a later stage, such as to verify device authenticity or otherwise reaffirm that the device is the same device as expected. The watermark, and optional digital signature(s), can be used to testify to authenticity at a given life cycle step. Timestamps and/or digital signatures can be combined with one or more watermarks to testify to process and control steps as well as to provide accountability, audit, or forensics.

Embodiments can combine strong physical unclonable function (PUF) technology with a protocol to create a unified approach to provide secure identification, authentication, tracking, and control of electronic devices. Embodiments can combine specific cryptographic protocols for integrity, and signing to create cryptographic certificates, ledgers, and other instruments that are securely and irrefutably bound to specific individual electronic devices. Embodiments can provide means to generate keys and certificates to bind. Embodiments can provide a specified process and protocols for life-cycle operations to facilitate a consistent process for tracking and use of electronic devices from manufacture to decommission of the electronic devices.

No standard approach currently exists for secure identification, authentication, tracking, and control of trusted electronic processing devices within supply chains or other portion of the life cycle of these electronic processing devices. Further, no known approach exists for secure field deployment of documents and objects such as new baselines of software and firmware that are securely bound to those specific individual electronic devices or systems using those devices.

PUF technology provides a hardware-grounded cryptographic primitive. Using PUF, one can derive a cryptographic entropy and keys from an electronic device, such as by using statistical processing. One can use a large number of independent PUF measurements whose values are derived from real-valued device behavioral characteristics that vary due to natural manufacturing process as input to a cryptographic entropy or key generation technique.

Electronic devices are increasingly unclonable, since they are fabricated to produce higher performance at increased frequencies with smaller geometries and at lower voltages. This makes it increasingly difficult to produce devices that are acceptably "identical." When enough measurements of a large number of independent parameters are taken, at sufficient precision, a problem of producing a second copy of device that produces the same measurements becomes increasingly intractable.

PUFs can be generally characterized as being either weak or strong PUFs. A weak PUF has a fixed limited number (typically one) of challenges per PUF instance. The weak PUF can be designed to restrict access or observability of responses such as to provide a more secure weak PUF. A strong PUF, in contrast, is typified by a more complex challenge-response behavior derived from a complex physical structure of the PUF. Typically, many physical components are involved in the generation of a response, and there is a very large number of possible challenges that can be applied to the strong PUF. PUF helper data, such as raw underlying physically observed phenomena, does not correspond to an idealized deterministic output without statistical manipulation. Furthermore, nondeterministic influences including environmental noise, supply voltages, temperature, or the like can be compensated for in order to produce statistically invariant and reproducible values. The pairing of a strong PUF challenge to the associated result is referred to as a challenge response pair (CRP). Strong PUFs have a nearly exponentially large CRP value space.

The security of strong PUFs does not rely on the security of the challenge-response interface, while a weak PUF does rely on the security of the challenge-response interface. The strong PUFs cannot be attacked by a full read-out of CRPs even if an adversary possesses the PUF for a long time. That said, it is still a good practice to protect a CRP interface to deter an adversary's ability to use CRP values for hypothesis testing in modelling attacks and or otherwise to facilitate CRP interface protocol attacks.

In general, strong PUFs can be used for creating fingerprints of individual electronic devices, can appropriately be used to irrefutably authenticate that a device is the same as that device as originally manufactured and furthermore can be used to irrefutably determine that no other device can be associated with a set of CRPs obtained in the validation process, data and metadata can be securely bound to a specific device based on the use of a strong PUF, a PUF combined with a classification function can be used to create a "fingerprint" recorded, serialized, and tracked through a database for supply chain, and a strong PUF can be used to help provide a complete supply chain and whole life use process that explains how to efficiently and effectively combine the use of PUFs for identification, authentication, and tracking with a set of procedural cryptographic techniques and tools to create a complete cradle to grave process that provides the additive capabilities for a) transfer of control from performer-to-performer or supplier-to-customer, b) sequential registration, time stamping, signing, recording, logging, and record transfer of transactions and transaction logs or ledgers for process performers, process actions events, locations, etc.

Embodiments can include an electronic device watermarking approach and process for secure identification, authentication, tracking, and control of electronic processing devices within supply chains or moreover during the whole life cycle use for these devices. Embodiments can use an arbitrary number of randomly generated electronic device watermarks derived from individual electronic processing devices. The watermarks can be created at any powered life cycle operation/step and then used by the step owner to provide proof-of-service-step performance and authenticity to down-stream consumers or users. Watermarks can include strong PUF derived cryptographic values that are bound to the corresponding electronic device. The watermarks can be used to bind information and objects to those individual electronic devices in a secure and irrefutable manner.

An electronic device watermark from a prior life cycle process step can be authenticated at a follow-on stage where device authenticity is screened or otherwise reaffirmed by a CRP. Watermarks, CRPs, and signatures can be used to testify to authenticity at each process step. Timestamps and digital signatures can be combined with watermarks to testify to process and control steps as well as to provide accountability, audit, and forensics. Cryptographic certificates with watermarks and signatures can be used to bind values and objects to specific devices in an unforgeable and irrefutable manner. Appendable transcripts or ledgers can be securely bound by watermarks to the devices to provide auditable chain-of-control logs as well as records of prior device/system history, etc.

Figure 1:
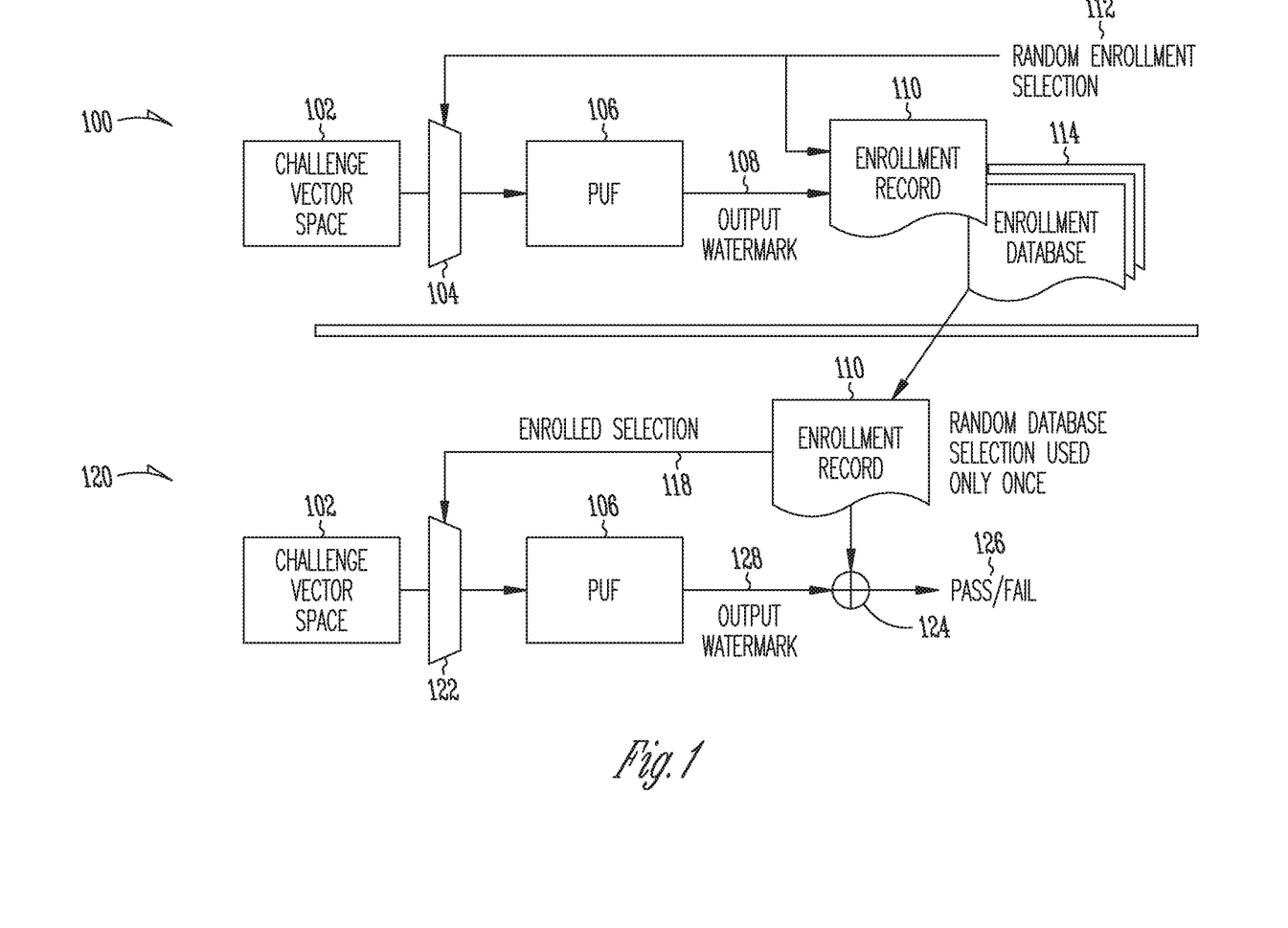
FIG. 1 illustrates, by way of example, a diagram of an embodiment of systems for watermarking and verification of electronic devices.

Embodiments can use cryptographic techniques and instruments, such as certificates, to record process transactions which are time stamped and signed by process performers and recipients, all securely bound to the specific devices or assemblies and systems that incorporate those electronic devices. Embodiments provide processes for transfer of control procedures securely bound to those specific devices or assemblies and systems that incorporate those devices FIG. 1 illustrates, by way of example, a diagram of an embodiment of systems for watermarking 100 and verification 120 of electronic devices. The system for watermarking 100 includes a challenge vector space 102 as input to a multiplexer 104 (or other selection device). A selected challenge vector from the challenge vector space 102 can be applied to a PUF 106 of an electronic device. The output of the PUF can be used as a watermark 108 for the electronic device. The output of the PUF can be stored, along with the challenge vectors used to generate the watermark, a device identification (a number uniquely identifying the electronic device), one or more characteristics of the electronic device (e.g., a make of the electronic device, a model of the electronic device, a date or year manufactured, software or firmware installed on the electronic device), as an enrollment record 110. A collection of enrollment records 110 can be stored on a memory device to generate an enrollment database 114.

The challenge vector space 102 comprises a collection of challenges, which define electrical stimulus inputs that are provided to the electronic device. The electrical stimulus can include a singular or pattern of voltages, currents, powers, or frequencies (e.g., a range of voltages, currents, power, and/or frequencies) provided to the electronic device and a location for the electrical stimulus. The response of the electronic device can include a power consumption, a voltage, current, power or frequency (e.g., a range of voltages, currents, power, or frequencies), temperature, a signal to noise ratio (SNR), a radio frequency (RF) pattern, such as an RF pattern of a signal created by the component or an RF interference pattern of the component. The response can be measured by monitoring a voltage and/or current, sensing a temperature, detecting an RF radiation pattern, and/or using the measured data to calculate a parameter, such as SNR, power, propagation delay, or other parameter. In some embodiments, the challenge or response can include an electrical and/or frequency based signal leakage.

In one or more embodiments, circuit probes can be set up to provide data to a machine external to the electronic device being monitored, and the machine can determine the response based on the probes. In other embodiments the response can be measured internally by the electronic device itself. The signals to be monitored can include inputs and/or outputs from one or more traces, pads, vias, or other component nodes, and/or signals from one or more sensors, such as an ohm meter, a current meter, a voltage meter, a temperature probe, a microphone, chemical sensor, magnetometer, accelerometer, gyroscope, capacitance sensor, position sensor, optical sensor, pressure sensor, force sensor, proximity sensor, or other sensor.

Using the system 100, the enrollment database 114 can be populated with enrollment records 110 that contain challenges and associated strong PUF outputs (watermarks 108) for electronic devices. The enrollment record 110 can be generated at one or more stages of an electronic device's life cycle. Examples of life cycle stages include electronic device fabrication, packaging, electrical testing, supplier receiving the electronic device, consumer receiving the electronic device.

The validation system 120 includes the challenge vector space 102, a multiplexer 122 (or other selection device), the strong PUF 106, and an enrollment record 110 from the enrollment database 114. Similar to the enrollment system 100, the validation system 120 chooses a challenge from the challenge vector space 102. A selected challenge 118 is provided as electrical stimulus to the PUF 106 of the electronic device. The output watermark 128 of the strong PUF 106 is compared, by a comparator 124, to the watermark 108 associated with the challenge and the electronic device in the enrollment record 110. If the watermarks 128 and 108 match, the electronic device passes validation as indicated by output 126. If the watermarks 128, 108 do not match, the electronic device fails validation as indicated by output 126.

In some embodiments, the watermark 108 can be used as input to a signature function to generate a digital signature. The digital signature can be used to verify that the device is authentic.

Figure 2:
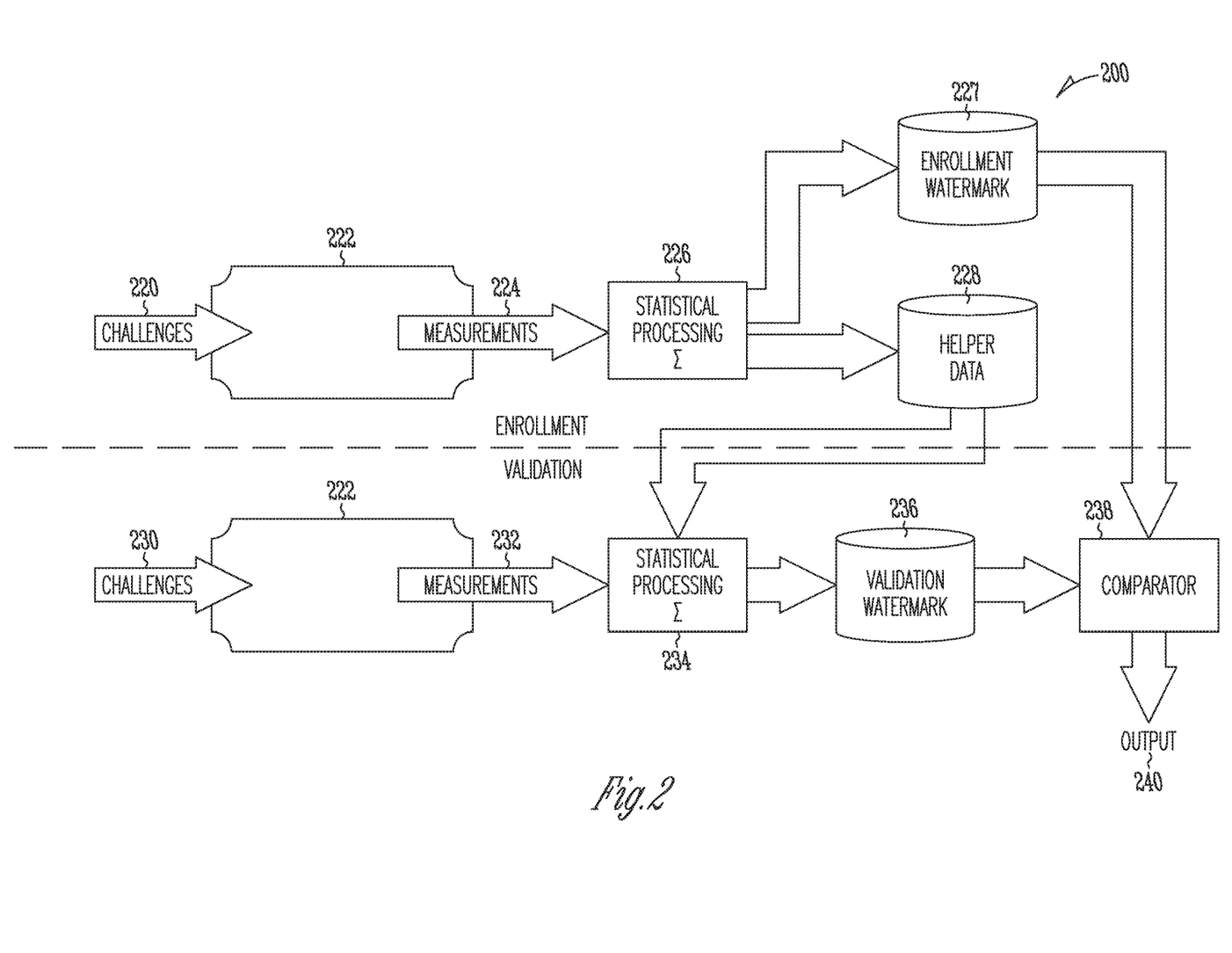
FIG. 2 illustrates, by way of example, a diagram of an embodiment of a system for electronic device enrollment and verification.

FIG. 2 illustrates, by way of example, a diagram of an embodiment of a system 200 for electronic device 222 enrollment and verification. The system 200 provides challenges 220 to a PUF 222. The electrical stimulus 220 is consistent with a selected challenge from the enrollment record 110. A measurement 224 of a response of the PUF 222 to the challenge 220 is provided to a statistical processing unit 226. The statistical processing unit 226 can include hardware, software, firmware, or a combination thereof, that performs mathematical operations. The hardware, software, or firmware can include one or more transistors, resistors, capacitors, diodes, inductors, logic gates (e.g., AND, OR, XOR, negate, buffer, or the like), multiplexers, oscillators, switches, memory devices, amplifiers, analog to digital converters, digital to analog converters, processing units (e.g., central processing units (CPUs), application specific integrated circuits (ASICs), field programmable gate arrays (FPGAs), graphics processing units (GPUs), or the like), a combination thereof, or the like The statistical processing unit 226 can perform mathematical operations, such as cryptographic operations, non-cryptographic operations, or a combination thereof on one or more of the measurements 224. The statistical processing unit creates two outputs; an enrollment watermark 227 and helper data 228. The helper data 228 can be used for error avoidance schemes during future validation processes.

A challenge 230, the same as to the challenge 220, can be provided to the PUF 222. The response of the PUF 222 to the challenges 230 are the measurements 232. Similar to statistical processing unit 226, the statistical processing unit 234 can perform mathematical operations, such as cryptographic operations, non-cryptographic operations, or a combination thereof on one or more of the measurements 232 of the response of the PUF 222. The statistical processing unit 234 uses the helper data 228 to create a validation watermark 236. A comparator 238 compares the enrollment watermark 227 and the validation watermark 236. The result can be an output 240 that indicates whether the device that includes the PUF 222 that created the validation watermark 236 is the same device that generated the enrollment watermark 227 and the helper data 228. Since a PUF response to a stimulus is unique to a device, the authentication of the device is not cloneable or spoofable.

Figure 3:
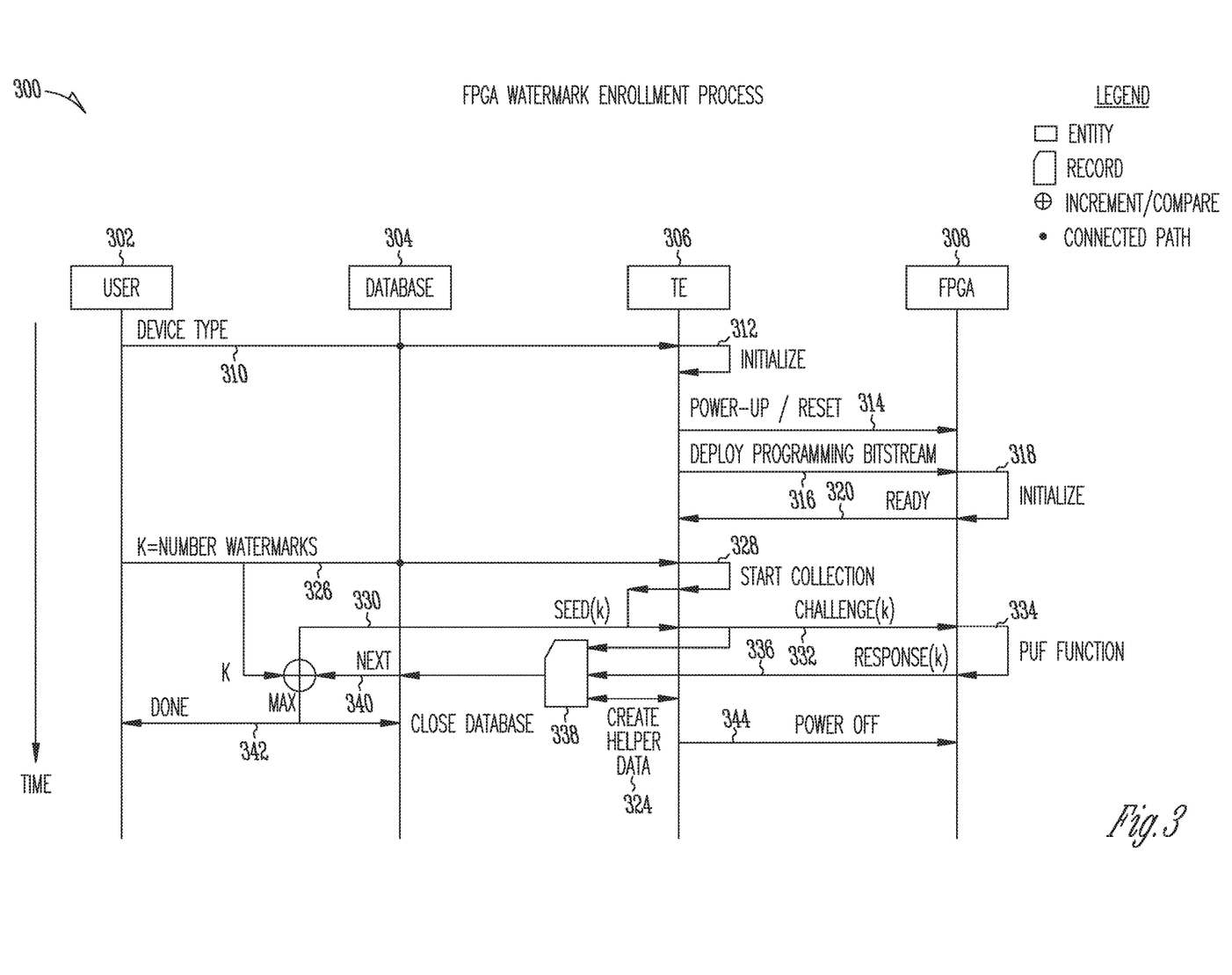
FIG. 3 illustrates, by way of example, a conceptual communication diagram of communications between devices of a device enrollment process.

FIG. 3 illustrates, by way of example, a conceptual communication diagram 300 of communications between devices during a device enrollment process. The device being enrolled in the example of FIG. 3 is an FPGA 308. During enrollment a user 302 operates a user interface to indicate a device type 310 that is provided to a database 304 and a test equipment (TE) 306. The TE 306 performs an initialize sequence 312 based on the device type 310. The TE 306 can send power on and/or reset 314 communications to the device that includes the PUF (the FPGA 308 in the example of FIG. 3). A programming bitstream 316 can be provide from the TE 306 to the FPGA 308, such as to cause the FPGA 308 to initialize 318. After initialization, the FPGA 308 can indicate it is ready 320 to the TE 306.

The user 302 can indicate how many watermarks/enrollment records, represented by an integer K 326 greater than zero, should be collected. The TE 306 can start collecting enrollment records 328. At 330, the TE 306 can select a challenge 332 to be provided to the FPGA 308. The FPGA 308 can receive the challenge 332, operate the PUF 334, and produce the response 336. The TE 306 can perform statistical or other mathematical operations on the response 336 to generate helper data 324. The response 336 can be stored as the enrollment watermark. The response 336 of the PUF to the challenge 332 can be stored with additional data such as the challenge 332, the helper data 324, the device type 310, and/or a device ID in the database 304, as an enrollment record 338. The process can increment the watermark count, K 326, and repeat the challenge selection and response collection for each of the watermarks until K 326 watermarks are generated and stored in the database 304. After K 326 watermarks 338 are generated or a maximum number of watermarks 338 are generated, the challenge selection and response collection can end 342 and the TE 306 can turn off the FPGA 308.

Figure 4:
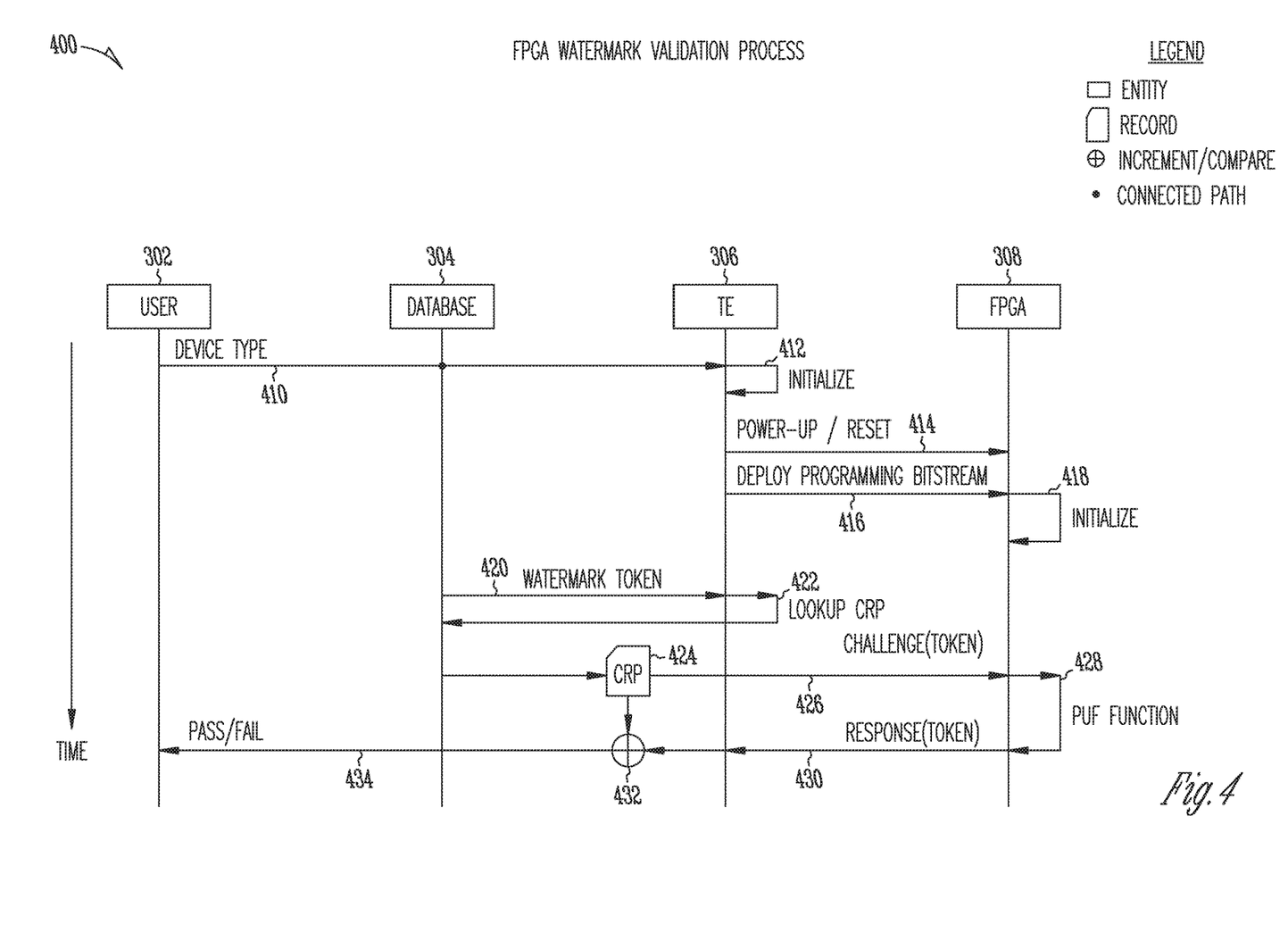
FIG. 4 illustrates, by way of example, a communication diagram of an embodiment of a watermark validation process.

FIG. 4 illustrates, by way of example, a communication diagram 400 of an embodiment of a watermark validation process. The validation process can begin similar to the enrollment process illustrated in FIG. 3. The communication diagram 400 includes the same devices as the communication diagram 300, but this is not a requirement. What is needed is a device with a PUF that can be challenged using a same stimulus as was provided in device enrollment and a database with the enrollment watermarks (responses to challenges provided in device enrollment). During validation the user 302 operates a user interface to indicate a device type 410 that is provided to a database 304 and the TE 306. The device type 410 can identify the device to be tested with enough specificity that the TE 306 understands how to communicate with the device and the input/output (I/O) of the device. The device type 410 can include a make and model of the FPGA (the device with the PUF to be tested, sometimes called device under test (DUT)). The TE 306 can perform an initialize sequence 412 based on the device type 410. The TE 306 can power on and/or reset 414 the device that includes the PUF (the FPGA 308 in the example of FIG. 4). A programming bitstream 416 can be provide from the TE 306 to the FPGA 308, such as to cause the FPGA 308 to initialize 418.

The TE 306 can look up a challenge/response pair (CRP) 424 in the database 304 based on the device type 410. The CRP 424 contains a challenge and response that were used in the enrollment process. The challenge 426 of the CRP 424 is the stimulus, to be provided to the FPGA 308, and the response of the CRP 424 is the enrollment watermark that will be used for comparison. The challenge 426 indicates to the FPGA a PUF function 428 to perform. The PUF function 428 is performed if the challenge 426 includes the proper stimulus.

The response 430 from the FPGA can be collected at the TE 306 and combined with helper data from the enrollment process to create the validation watermark. The result can be compared to responses of the corresponding CRP 424 in the database 304. The FPGA can pass validation as the expected FPGA 308 if the validation watermark matches the enrollment response in the CRP 424. The FPGA can fail validation 434 as the expected FPGA 308 if the validation watermark does not match the enrollment response in the CRP 424.

Figure 5:
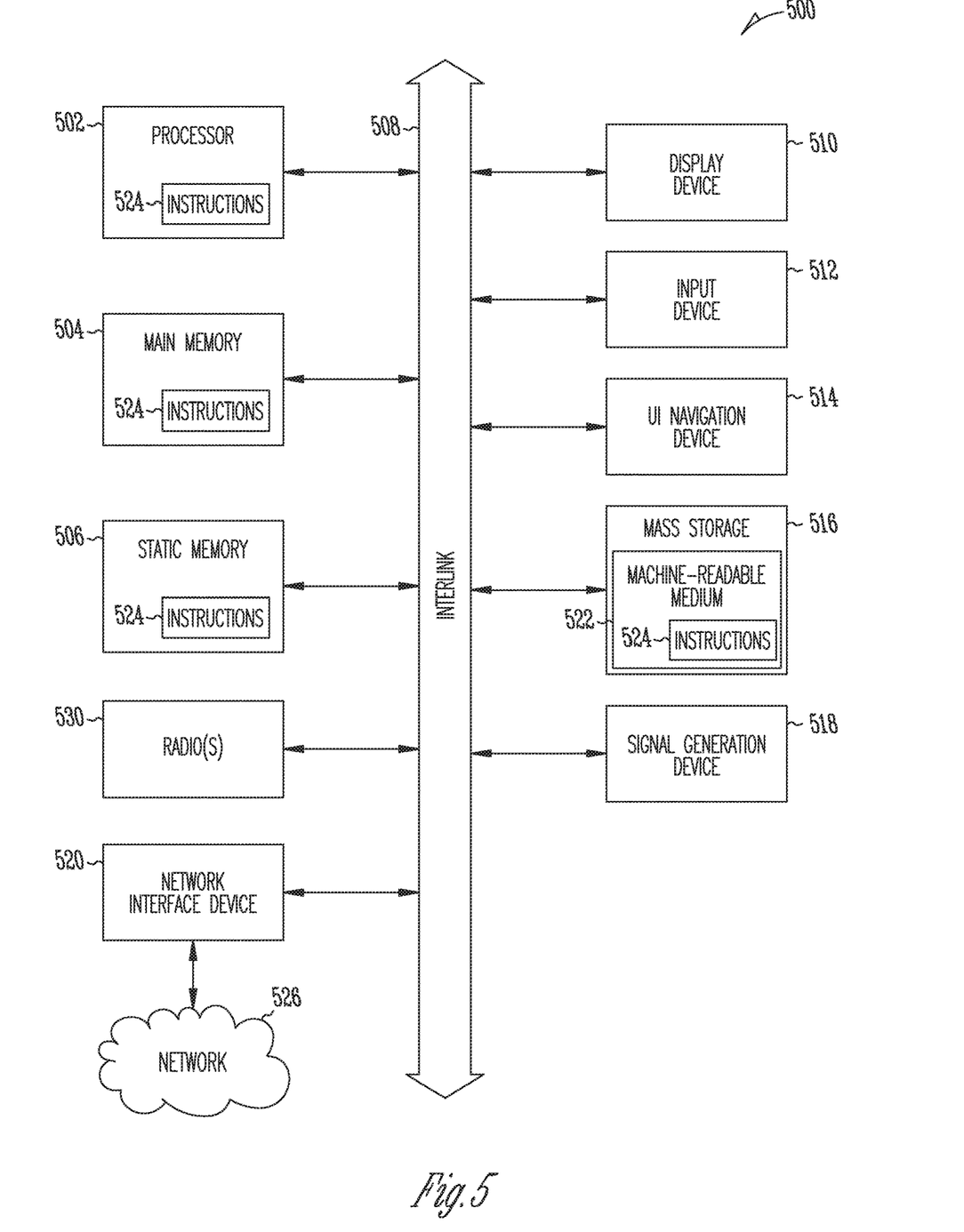
FIG. 5 illustrates, by way of example, a diagram of an embodiment of a compute device that include machine-readable medium.

FIG. 5 illustrates, by way of example, a block diagram of an embodiment of a machine 500 on which one or more of the methods as discussed herein can be implemented. The machine 500 can include a computing device instantiated as a compute device or server. One or more of the PUF 106, 222, multiplexer 104, 122, statistical processing 226, TE 306, or FPGA 308 can include one or more of the items of the machine 500. In alternative embodiments, the machine 500 operates as a standalone device or may be connected (e.g., networked) to other machines. In a networked deployment, the machine 500 may operate in the capacity to monitor multiple components and circuits and may operate as a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 500 includes a processor 502 (e.g., a central processing unit (CPU), a graphics processing unit (GPU) or both), a main memory 504 and a static memory 506, which communicate with each other via a bus 508. The machine 500 may further include a video display unit 510 (e.g., a liquid crystal display (LCD), light emitting diode (LED), a cathode ray tube (CRT), or the like). The machine 500 may include an alphanumeric input device 512 (e.g., a keyboard), a user interface (UI) navigation device 514 (e.g., a mouse), a disk drive unit 516, a signal generation device 518 and a network interface device 520.

The memory 504, 506, 516 are examples of a storage device that can include instructions stored thereon that are executed by a machine, such as a processor or other processing circuitry, and cause the machine to perform operations. The instructions and other information can be encrypted or otherwise protected by one or more security measures, such as to help protect the operational boundaries and other data stored thereon.

The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some example embodiments, the processors or processor-implemented modules may be located in a single geographic location (e.g., within a home environment, an office environment, or a server farm). In other example embodiments, the processors or processor-implemented modules may be distributed across a number of geographic locations.

EXAMPLES AND ADDITIONAL NOTES

Example 1 can include a system for validating an identity of an electronic device, the system comprising a database (DB) including physical unclonable function (PUF) challenge and response pairs (CRPs) associated with a device identification and a device type, test equipment (TE) coupled to the DB, the TE operable to provide electrical stimulus consistent with a challenge of a CRP, a device under test (DUT) including a PUF operable to provide a response to the electrical stimulus, and the TE configured to compare the provided response to responses of the CRPs and validate the identity of the electrical device when the response of the DUT matches the response of the CRP or invalidating the identity of the electrical device when the response of the DUT does not match the response of the CRP.

In Example 2, Example 1 can further include, wherein the CRPs are determined at various stages of manufacturing the DUT including fabrication and packaging.

In Example 3, at least one of Examples 1-2 can further include, wherein the CRPs are generated by a first entity and validated by a second entity, unrelated to the first entity.

In Example 4, at least one of Examples 1-3 can further include, wherein the first entity is a supplier and the second entity is a consumer.

In Example 5, at least one of Examples 1-4 can further include, wherein the TE is further operable to select a single CRP out of all the CRPs associated with a device identification of the DUT.

In Example 6, Example 5 can further include, wherein the TE randomly selects the CRP of the CRPs.

In Example 7, Example 5 can further include, wherein the CRP Of the CRPs is selected by a user through a user interface coupled to the TE.

In Example 8, at least one of Examples 1-7 can further include processing circuitry configured to determine a digital signature based on the watermark to verify a device identity.

Example 9 can include a method comprising providing, by test equipment (TE), electrical stimulus consistent with a challenge of a challenge response pair (CRP) to a physical unclonable function (PUF) of a device under test (DUT), receiving, by the TE and from the DUT, a response to the electrical stimulus, comparing, by the TE, the provided response to responses to CRPs in a database including PUF CRPs associated with a device identification and a device type, and validating the identity of the DUT when the response of the PUF to the electrical stimulus matches the response of the CRP or invalidating the identity of the electrical device when the response of the PUF does not match the response of the CRP.

In Example 10, Example 9 can further include determining the CRPs at various stages of manufacturing the DUT including fabrication and packaging.

In Example 11, at least one of Examples 9-10 can further include, wherein the CRPs are generated by a first entity and validated by a second entity, unrelated to the first entity.

In Example 12, Example 11 can further include, wherein the first entity is a supplier and the second entity is a consumer.

In Example 13, at least one of Examples 9-12 can further include selecting, by the TE a single CRP out of all the CRPs associated with a device identification of the DUT.

In Example 14, Example 13 can further include, wherein the TE randomly selects the CRP of the CRPs.

In Example 15, Example 13 can further include, wherein the CRP of the CRPs is selected by a user through a user interface coupled to the TE.

In Example 16, at least one of Examples 9-15 can further include determining a digital signature based on the watermark to verify a device identity.

Example 17 includes a non-transitory machine-readable medium including instructions that, when executed by a machine, cause the machine to perform operations comprising providing electrical stimulus consistent with a challenge of a challenge response pair (CRP) to a physical unclonable function (PUF) of a device under test (DUT), receiving, from the DUT, a response to the electrical stimulus, comparing the provided response to responses to CRPs in a database including PUF CRPs associated with a device identification and a device type, and validating the identity of the DUT when the response of the PUF to the electrical stimulus matches the response of the CRP or invalidating the identity of the electrical device when the response of the PUF does not match the response of the CRP.

In Example 18, Example 17 can further include, wherein the operations further comprise selecting, by the TE a single CRP out of all the CRPs associated with a device identification of the DUT.

In Example 19, Example 18 can further include, wherein the CRP of the CRPs is randomly selected.

In Example 20, at least one of Examples 17-19 can further include, wherein the operations further comprise determining a digital signature based on the watermark to verify a device identity.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for validating an identity of an electronic device, the system comprising:
a database (DB) including physical unclonable function (PUF) challenge and response pairs (CRPs) associated with a device identification and a device type;
test equipment (TE) coupled to the DB, the TE operable to provide electrical stimulus consistent with a challenge of a CRP of the CRPs;

a device under test (DUT) including a strong PUF operable to provide a response to the electrical stimulus, wherein the strong PUF comprises a PUF combined with a classification function, the classification function having a non-fixed number of challengers per PUF instance; and the TE configured to compare the provided response to responses of the CRPs and validate the identity of the electrical device when the response of the DUT matches the response of the CRP or invalidating the identity of the electrical device when the response of the DUT does not match the response of the CRP.

2. The system of claim 1, wherein the CRPs are determined at various stages of manufacturing the DUT including fabrication and packaging.

3. The system of claim 1, wherein the CRPs are generated by a first entity and validated by a second entity, unrelated to the first entity.

4. The system of claim 1, wherein the first entity is a supplier and the second entity is a consumer.

5. The system of claim 1, wherein the TE is further operable to select a single CRP out of all the CRPs associated with a device identification of the DUT.

6. The system of claim 5, wherein the TE randomly selects the CRP of the CRPs.

7. The system of claim 5, wherein the CRP Of the CRPs is selected by a user through a user interface coupled to the TE.

8. The system of claim 1, further comprising processing circuitry configured to determine a digital signature based on a watermark to verify a device identity.

9. A method comprising:
providing, by test equipment (TE), electrical stimulus consistent with a challenge of a challenge response pair (CRP) to a strong physical unclonable function (PUF) of a device under test (DUT), wherein the strong PUF comprises a PUF combined with a classification function, the classification function adding a non-fixed number of challengers per PUF instance;
receiving, by the TE and from the DUT, a response to the electrical stimulus;
comparing, by the TE, the provided response to responses to CRPs in a database including PUF CRPs associated with a device identification and a device type; and
validating the identity of the DUT when the response of the PUF to the electrical stimulus matches the response of the CRP or invalidating the identity of the electrical device when the response of the PUF does not match the response of the CRP.

10. The method of claim 9, further comprising determining the CRPs at various stages of manufacturing the DUT including fabrication and packaging.

11. The method of claim 9, wherein the CRPs are generated by a first entity and validated by a second entity, unrelated to the first entity.

12. The method of claim 11, wherein the first entity is a supplier and the second entity is a consumer.

13. The method of claim 9, further comprising selecting, by the TE a single CRP out of all the CRPs associated with a device identification of the DUT.

14. The method of claim 13, wherein the TE randomly selects the CRP of the CRPs.

15. The method of claim 13, wherein the CRP of the CRPs is selected by a user through a user interface coupled to the TE.

16. The method of claim 9, further comprising determining a digital signature based on a watermark to verify a device identity.

17. A non-transitory machine-readable medium including instructions that, when executed by a machine, cause the machine to perform operations comprising:
providing electrical stimulus consistent with a challenge of a challenge response pair (CRP) to a strong physical unclonable function (PUF) of a device under test (DUT), wherein the strong PUF comprises a PUF combined with a classification function, the classification function adding a non-fixed number of challengers per PUF instance;
receiving, from the DUT, a response to the electrical stimulus;
comparing the provided response to responses to CRPs in a database including PUF CRPs associated with a device identification and a device type; and
validating the identity of the DUT when the response of the PUF to the electrical stimulus matches the response of the CRP or invalidating the identity of the electrical device when the response of the PUF does not match the response of the CRP.

18. The non-transitory machine-readable medium of claim 17, wherein the operations further comprise selecting, by the TE a single CRP out of all the CRPs associated with a device identification of the DUT.

19. The non-transitory machine-readable medium of claim 18, wherein the CRP of the CRPs is randomly selected.

20. The non-transitory machine readable medium of claim 17 wherein the operations further comprise determining a digital signature based on a watermark to verify a device identity.

* * * * *